United States Patent Office 2,988,347
Patented June 13, 1961

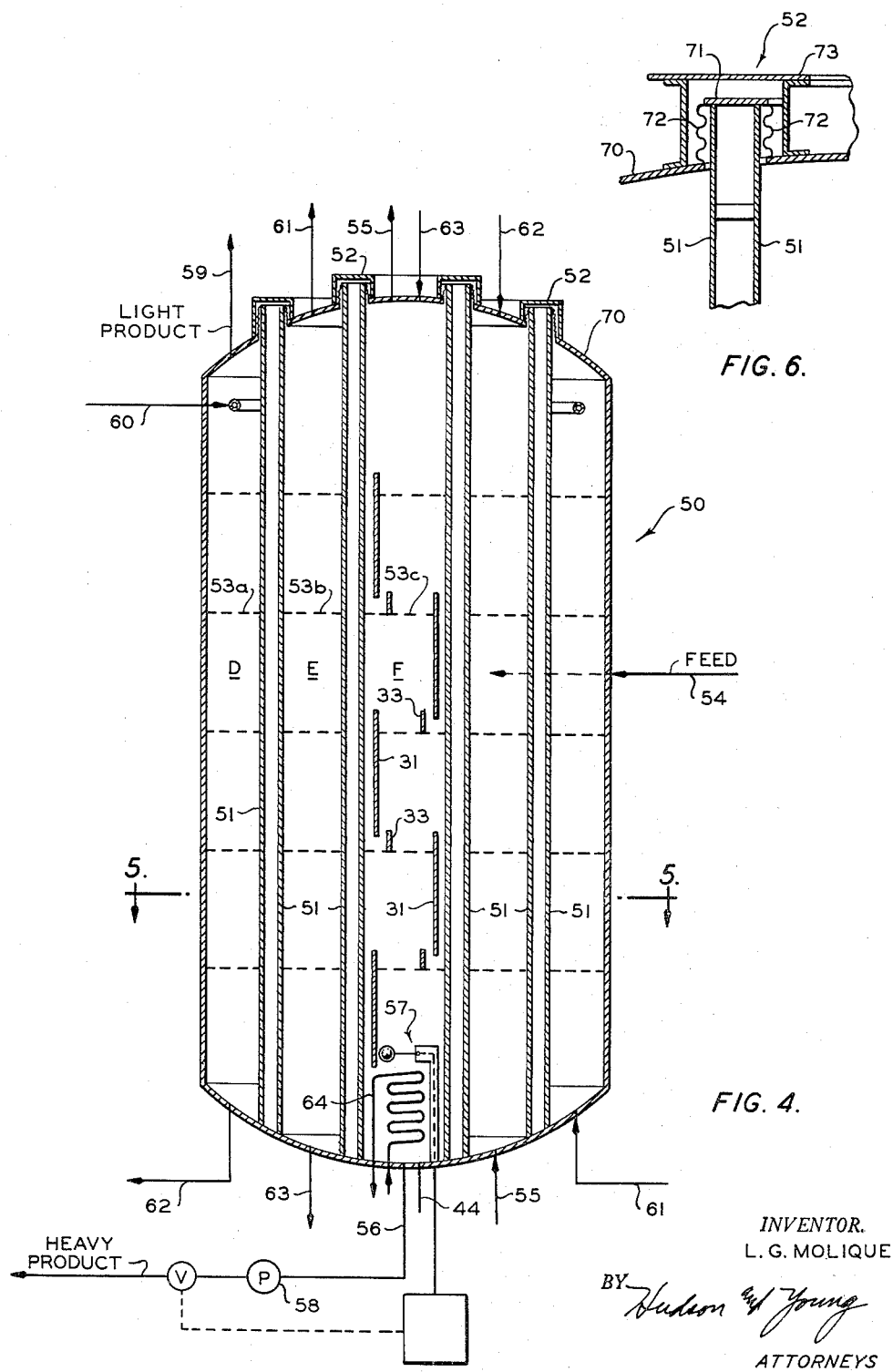

2,988,347
FLUID-LIQUID CONTACTING APPARATUS
Lawrence G. Molique, Bartlesville, Okla., assignor to Phillips Petroleum Company, a corporation of Delaware
Filed Aug. 13, 1956, Ser. No. 603,753
15 Claims. (Cl. 261—141)

This invention relates to light fluid phase-heavy liquid phase contactors. In one aspect it relates to vapor-liquid contactors, such as absorption, stripping, and fractional distillation columns. In another aspect it relates to liquid-liquid contactors such as those used in solvent extraction operations.

In conventional columns for liquid-liquid or vapor-liquid contacting, considerable length of the contacting section is frequently required. For example, in many cases fractional distillation columns requiring 50 or more contacting trays are constructed as a single unit. Such units many times extend a hundred feet or more into the air. Such columns are heavy and require a substantial support in the form of bases of large diameter positioned far into the ground. Under some conditions guy wires or cables are required to assist in resisting horizontal forces due to wind velocity.

I have devised a type of phase contactor which is relatively low and requires a minimum of support, no guy wires, and also a minimum of structure for support of auxiliary equipment. My contactor embodies a vessel of relatively large diameter and of short length and has one or more vertical partitions dividing the vessel into two or more compartments or sections, each section being equivalent to a given section along the vertical length of a conventional column.

An object of my invention is to provide a phase contactor which does not extend to great heights.

Another object of my invention is to provide a phase contactor which requires no guy wires or cables or other lateral support.

Yet another object of my invention is to provide such a contactor which requires less steel for its construction than conventional contactors of similar capacity.

Another object of my invention is to provide such a contactor which is relatively simple and inexpensive to construct from a labor point of view as well as from a material of construction point of view.

Still another object of my invention is to provide a column particularly adapted for low pressure 2-phase contacting which is relatively short as compared to conventional contactors.

Still other objects and advantages of my invention will be realized upon reading the following description which, taken with the attached drawing, forms a part of this specification.

In the drawing,

FIGURE 4 is an elevational view, partly in section, of another embodiment of my invention.

FIGURE 6 illustrates, on an enlarged scale, a portion of the apparatus of FIGURE 4.

My invention comprises particularly an apparatus for promoting contact between a light fluid phase and a heavy liquid phase comprising, in combination, a vessel being adapted for positioning upright, a partition extending axially in said vessel dividing same into first and second compartments extending substantially throughout the axial dimension of said vessel, light fluid phase-heavy fluid phase contact promoting means disposed operatively in each of said compartments, a first conduit communicating the upper end portion of said second compartment with the lower end portion of said first compartment for passage of said light fluid phase from said second to said first compartment, a second conduit communicating the lower end portion of said first compartment with the upper portion of said second compartment for passage of heavy liquid phase from said first compartment to said second compartment, an outlet for light fluid phase from the upper end portion of said first compartment, an outlet for heavy liquid phase from the lower end portion of said second compartment, and means for introduction of fluids to be contacted into said apparatus.

Figure 1:
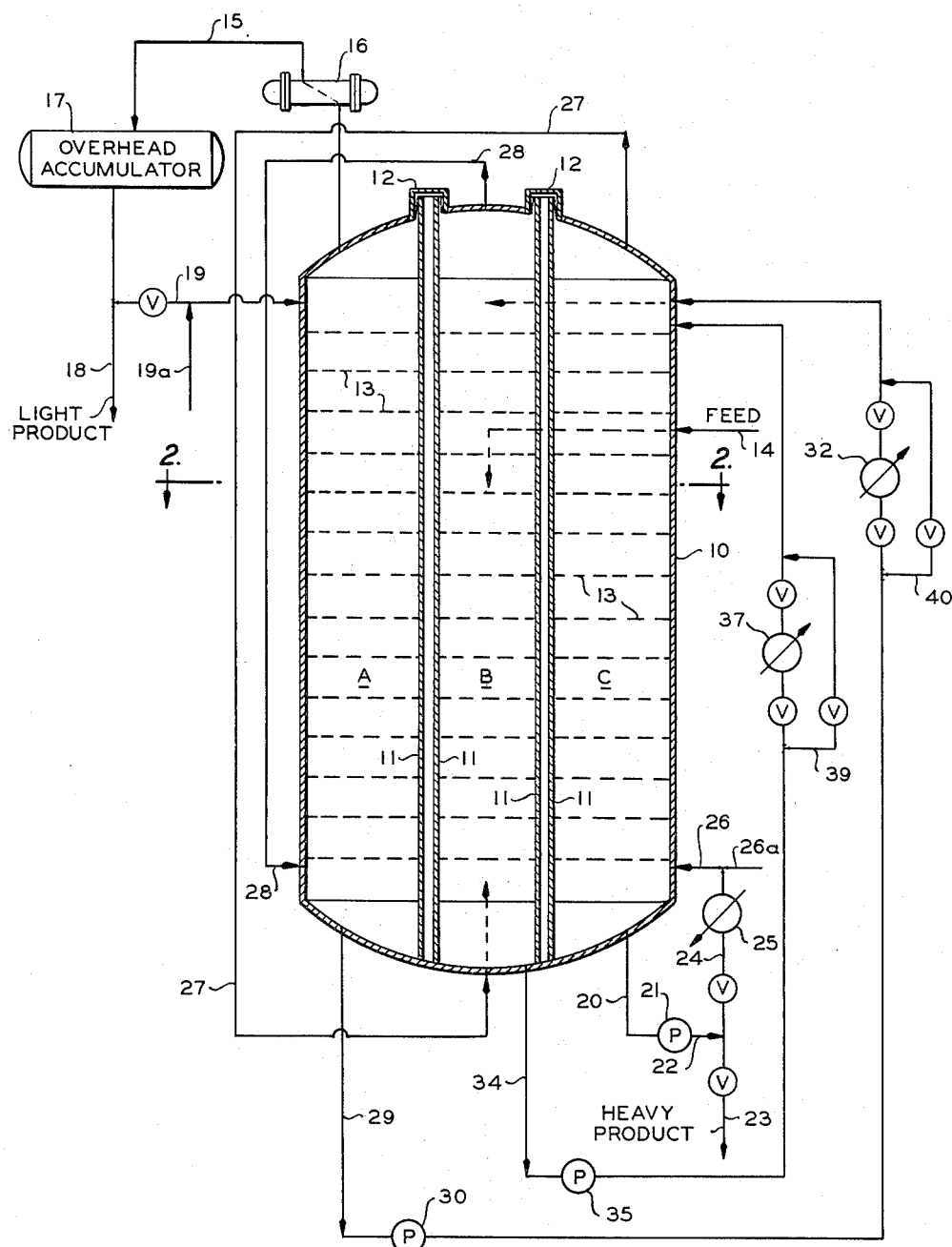
FIGURE 1 is an elevational view, partly in section, illustrating one embodiment of my invention.
Figure 2:
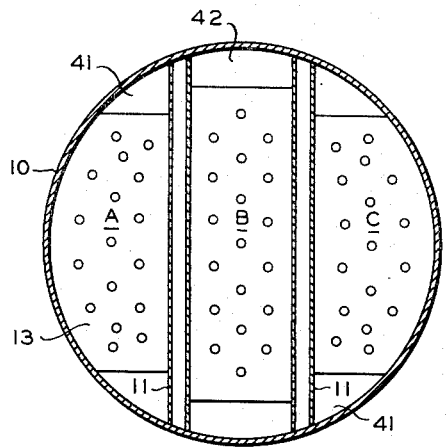
FIGURE 2 is a part cross sectional view taken on the line 2—2 of FIGURE 1.

Referring now to the drawing, and particularly to FIGURE 1, reference numeral 10 refers to a vessel in which is disposed the phase contacting compartments of my invention. This vessel is provided with two pairs of double walls 11 which extend the full height and across the width of the vessel thereby dividing the vessel into three compartments, A, B and C. The particular horizontal cross section of each of these three compartments is best seen in FIGURE 2. These compartments are provided with phase contacting apparatus or packing material such as bubble cap trays or other suitable contacting equipment. For illustrative purposes, I will describe the contactors of my invention as being provided with bubble cap trays 13. In FIGURE 2 the spaces identified by reference numerals 41 and 42 merely represent downcomer sections of the trays. In FIGURE 1, section A illustrates the top of the column, section B the middle section and section C the lower or bottom section. The top section A is provided with a conventional overhead vapor line 15, a condenser 16, an overhead accumulator 17, a reflex line 19 and a light product withdrawal line 18. The kettle portion of the lower section C is provided with a bottoms removal line 20, a pump 21 for passage of kettle product through a pipe 22. A portion of the liquid from pipe 22 flows through pipe 24, through heater 25 and on through a pipe 26 into the kettle section for reboiling purposes. That portion of the bottoms product not needed for reboiling purposes is withdrawn through the bottoms product line 23. Heater 25 is heated by steam or other fluid or, when desired, is a fired heater. The aforementioned overhead vapor and reflux providing apparatus and this reboiler apparatus are conventional equipment with fractionating columns.

A pipe 27 conducts vapor from the top of compartment C to the bottom of compartment B and pipe 28 conducts vapor from the top of compartment B to the bottom of compartment A. Pipe 34 is provided for passage of liquid from the bottom of compartment B to the top of compartment C and pipe 29 is provided for passage of liquid from the bottom of compartment A to the top of compartment B. Pipes 29 and 34 are provided, respectively, with pumps 30 and 35.

When the apparatus of FIGURE 1 is used as a fractional distillation column, the coolers 32 and 37 in pipes 29 and 34, respectively, are not used and accordingly valves in these pipes are closed and the valves in corresponding bypass pipes 40 and 39 are opened so that the liquids being transferred from the bottom of compartments A and B will bypass the coolers.

Since material to be fractionally distilled is ordinarily introduced into a distillation column at about a midpoint vertically of the column, I provide feed line 14 disposed through the wall of vessel 10 and through partition 11 for discharging feed to the middle compartment B.

In order to provide for expansion of partitions 11 I provide expansion joints 12 which are similar to the expansion joint illustrated in FIGURE 6. The joint specifically illustrated in FIGURE 6, however, refers to the expansion joints employed with the column illustrated in FIGURE 4.

Figure 3:
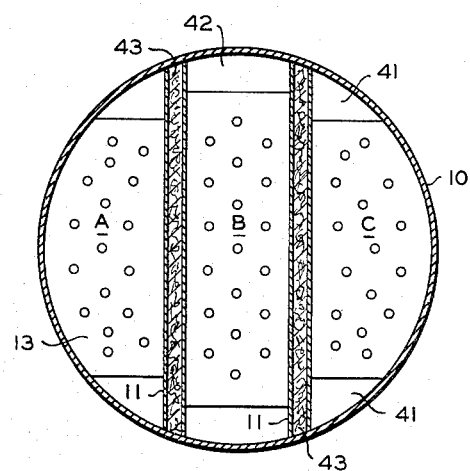
FIGURE 3 is a cross-sectional view of FIGURE 1 illustrating an alternate form of the apparatus illustrated in FIGURE 2.

When using the column illustrated in FIGURES 1 and 2 for distilling relatively narrow boiling range feed materials and wherein the temperature differential from tray to tray in the column is not great, the partitions 11 are, if desired, single partitions, that is, merely a single thickness of metal. However, when there is an appreciable temperature differential from tray to tray, I prefer to provide double walls as illustrated in FIGURES 1 and 2. In some cases use of the double wall partitions with merely an air space between the two walls of the partition is satisfactory. However, in some cases it may be desirable to provide insulation between the two wall portions so that there will be little to no heat conduction from one compartment to an adjacent compartment. FIGURE 3 illustrates a cross sectional view of such a column as that illustrated in FIGURE 1 but with insulating material 43 within the partitions 11. Fiberglass, vermiculite, or any other suitable insulation desired can be used.

FIGURE 4 of the drawing illustrates an embodiment of my invention in which partitions 51 disposed in vessel 50 are tubular in form thereby providing an inner compartment F, tubular in form. Surrounding compartment F is compartment E which is annular in form and surrounding compartment E is compartment D which also is annular in form. This latter compartment is defined by the outer wall of vessel 50 and the first tubular partition. The partitions illustrated in FIGURE 4 can, as mentioned above relative to FIGURE 1, be partitions of a single thickness of structural material or they can be double walled partitions with or without insulation. When provided with insulation, reference numeral 69 identifies such insulation illustrated in FIGURE 5.

Figure 5:
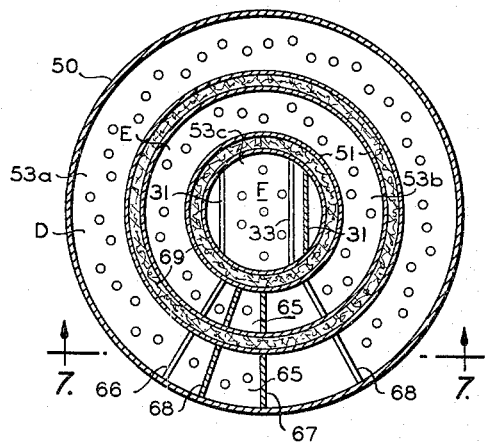
FIGURE 5 is a horizontal sectional view taken on the line 5—5 of FIGURE 4.
Figure 7:
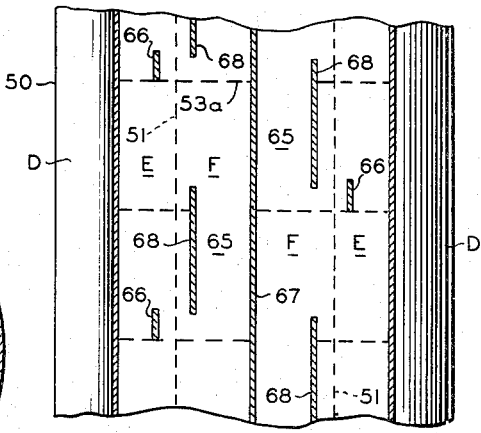
FIGURE 7 is an elevational view, in section, taken along the line 7—7 of FIGURE 5.

The inner compartment F is provided with downcomers 31 and weirs 33 in a more or less conventional manner. One arrangement of downcomers for use in annular contactors, such as compartments D and E, is illustrated in FIGURES 5 and 7. In FIGURES 5 and 7 are illustrated vertical partition plates 67 which forms one wall of the downcomer and the end of a tray, the other wall of the downcomer being identified by plates 68. As noted in FIGURE 7, the upper end of plates 68 forms weirs over which liquid from the trays flows on entering the downcomer 65 and the lower ends of plates 68 form vapor traps in conjunction with wiers 66.

The contactor of FIGURE 4 is provided with pipes for passage of vapor and liquid from compartment to compartment as follows: pipe 61 conducts vapor from the top of compartment E to the bottom of compartment D, pipe 55 conducts vapor from the top of compartment F to the bottom of compartment E, while pipe 59 removes the overhead vapors from the column (compartment D). The pipe 59 is connected with a reflux producing heat exchanger and accumulator as mentioned relative to FIGURE 1. Reflux from an accumulator, not shown, enters compartment D by way of a pipe 60.

Liquid from the bottom of compartment D is passed through a pipe 62 to the top of compartment E, liquid from the bottom of compartment E is passed through a pipe 63 into the top of compartment F, and liquid bottoms product is removed from compartment F through a pipe 56. Pipe 56 is provided with a pump 58 for transfer of material therein and the discharge of the pump is controlled by a liquid level control assembly 57. Means is provided, if desired, for heating a portion of liquid from pipe 56 for circulation through a reboiler coil 64 or, if desired, an extraneous heating fluid is provided for passage through coil 64.

Bubble cap trays 53a, 53b and 53c are provided respectively for compartments D, E and F. Since compartment E represents the middle third of this contacting column, a feed line 54 is provided for introduction of feed to section E when this column is used as a fractional distillation column as just described.

The top cover of vessel 50 is identified by reference numeral 70 and it is to this cover that I have illustrated all of the conduits leading into and out of the vessel. Also provided in cooperation with the top cover 70 are expansion joints 52. These expansion joints are illustrated on an enlarged scale in FIGURE 6. A single wall partition, or a double wall partition 51 is illustrated as protruding through cover plate 70. In case the partition is a double wall partition a plate 71 is attached to the top thereof for closing the space between the plates of the partition and to provide a support for expansible members 72. The expansible members 72 are more or less similar to expansible members of which thermally expansible and pressure expansible bellows are formed. These expansible members 72 are also attached vapor tight to the cover plate 70 so that there cannot be leakage of vapor from one compartment to another. These expansion joints are enclosed within housings 73 so that in case of leakage through an expansible member 72 vapors will not be lost to the atmosphere. Housings 73 also protect the expansion joints against mechanical injury as by falling objects or the like.

As mentioned above relative to the apparatus of FIGURE 1, if there is little temperature differential from tray to tray in vessel 50, partitions 51 are, if desired, single thickness partitions while if there is appreciable temperature differential it is preferable to provide double wall partitions. If temperature differentials are relatively great, it is preferable to provide insulation in the space between the walls of the partitions, such insulation being illustrated in FIGURE 5 and identified by reference numeral 69.

The apparatus illustrated in FIGURES 1 and 4 are also used in absorption operations such as in the absorption of gasoline boiling range hydrocarbons from wet natural gas or in plant vapor recovery operations. When the apparatus of FIGURE 1 is used as an absorber, the overhead condenser 16 and reflux accumulator 17, of course, are not needed and pipe 15 will then conduct stripped gas from the absorber to fuel or pipe line or such disposal as desired. Since a reboiler is not used in absorption operations, heater 25 and return pipes 24 and 26, of course, are not provided and the material which is removed through pipe 20 will be a rich absorption oil for passage to a conventional stripper.

The apparatus of FIGURES 1 and 4 are also used as a stripper in which operation rich oil to be stripped of absorbed materials is introduced into the column by way of pipes 19a and 19 (FIGURE 1) and by pipe 60 (FIGURE 4). The overhead condenser and accumulator are used for condensing stripped materials from the absorption oil but, of course, none of the condensed material is added as reflux. Steam or other stripping agent is introduced into the lower portions of compartment C (FIGURE 1) and compartment F (FIGURE 4) from pipes 26a and 26 (FIGURE 1) and from pipe 44 (FIGURE 4).

The apparatus of FIGURE 4 is also used for absorptions and for stripping operations in the same general manner as just described relative to the apparatus of FIGURE 1. For absorption purposes lean absorption oil is introduced through pipe 60 and rich absorption is removed through pipe 56. The absorber, of course, does not require reboiling nor refluxing. When used as a stripper, rich oil to be stripped is introduced through pipe 60 and live steam or other stripping medium is introduced into the kettle section of compartment F as through pipe 44 in a conventional manner.

One advantage of my form of phase contactors is that it is a relatively simple matter to construct the several sections or compartments of different cross sectional areas. For example, when the columns are operated as reboiled-absorbers by adding lean oil through pipes 19 and 60 into vessels 10 and 50 respectively, feed material enters through pipes 14 and 54 respectively, and heaters 25 and 64, respectively, are employed for reboiling the respective kettle sections. Reboiler absorbers are frequently constructed with the upper section being of smaller cross section area than the lower portion. In the embodiment illustrated in FIGURE 1 for use as a reboil absorber, compartment A is made of small cross section while compartments B and C are larger. Similarly, when the apparatus of FIGURE 4 is used as a reboiler absorber, compartment D is the small cross section compartment and compartments E and F are larger in cross sectional areas. Furthermore, the partitions used within my vessels are ordinarily made of light gauge material since my vessels are particularly adapted to treating materials under relatively low pressures. As mentioned above, the partitions are sometimes constructed of spaced-apart light gauge plates with insulation between them as desired. When desired, the vessels of FIGURES 1 and 4 are provided with one partition thereby dividing the vessels into two compartments, and when desired 2, 3 or more partitions are used dividing the vessels into as many compartments as desired and each compartment having any desired cross sectional area.

As illustrative of the saving in material of construction of my contactors over contactors of conventional conventional construction is the following example:

Conventional:
Height, ft. _____ 72
Diameter, ft. _____ 5
Volume, cubic ft. _____ $450\pi$
Cross section, sq. ft. _____ $6.25\pi$
External surface, sq. ft. _____ $372.5\pi$ $$\left(\text{Ends}—(2\pi)\times\left(\frac{25}{4}\right)=12.5\pi\right)$$

$$(\text{Side}—(5\pi)\times(72)=360.0\pi)$$

Invention—3 compartments, FIGURE 1:
Height, ft. _____ 24
Diameter, ft. _____ $5\sqrt{3}$
Volume, cu. ft. _____ $450\pi$
Cross section, sq. ft. _____ $18.75\pi$
External surface, sq. ft. _____ $245.5\pi$ $$\left(\text{Ends}—(2\pi)\left(\frac{25}{4}\right)(3)=37.5\pi\right)$$

$$(\text{Side}—(5\sqrt{3}\pi)(24)=208\pi)$$

Partitions (light gauge), sq. ft., $128\pi$ $$\left[\frac{(2)(24)(0.97)(5\sqrt{3})}{\pi}=128\pi\right]$$

It can be seen from the above values that my vessel (FIGURE 1) requires $$\frac{100\times 245.5\pi}{372.5\pi}$$

or about 66 percent as much heavy external shell metal and of course 66 percent as much external insulation as employed conventionally. $\pi$ is the geometric constant 3.1416.

My partitions require only a very light gauge material of about 128 square feet area in this example. The insulation, when used, for the partitions would be 128 square feet, but of about one-half the thickness of the external insulation due to the lower differential temperature in the tower between the sections as compared with the differential between the conventional tower and the atmosphere. An equivalent amount of insulation would be about $64\pi$ square feet. Hence, when insulating, I use about $(64\pi+245.5\pi)$ or $309.5\pi$ square feet as compared with the conventional $372.5\pi$ square feet, or I use only about 83 percent as much (which is also a considerable saving of labor and materials).

When employing two spaced-apart light weight sheets in each partition, the insulation can, if desired, be eliminated. The partitions can be segmented for handling and ease of assembly.

Advantages of my apparatus are low height (approximately one-third of conventional for the 3-compartment vessel of FIGURES 1 and 4) thereby requiring shorter instrument leads, less ladders, no stairways, and less catwalks. In many installations, anchors for supporting tall towers and guy wires are not needed; also, less depth of footing is required for my contactors. The overhead accumulator on my units need not be set at such a high elevation as is conventionally required; and, when operating at relatively low pressure, I can gravitate reflux to the tower when used as a fractional distillation tower. Repair and maintenance hazards and costs due to heights are minimized by my invention.

Materials of construction employed in the contactors of my invention are, in general, selected from among those commercially available. Special materials are, of course, needed when treating corrosive materials.

While certain embodiments of the invention have been described for illustrative purposes, the invention obviously is not limited thereto.

In FIGURE 4 the middle section can in some cases be the upper section of the fractionator and the outer annular section the kettle section. Any desired arrangement of section is used dependent upon conditions of any given fluid-liquid contacting problem.

My apparatus has been herein described for illustrative purposes as a fractional distillation column, as an absorber and as a stripper. It is also used as a liquid-liquid contactor in which a low density liquid passes upward in counter-current relation to a downflowing heavy liquid phase, as in solvent extraction operations.

I claim:

1. An apparatus for promoting contact between a light fluid phase and a heavy liquid phase comprising, in combination, a vessel being adapted for positioning upright, a partition extending axially throughout the length of said vessel dividing same into first and second compartments, light fluid phase and heavy liquid phase contact promoting means disposed operatively in each of said compartments, a first conduit communicating the upper end portion of said second compartment with the lower end portion of said first compartment for passage of said light fluid phase from said second compartment to said first compartment, a second conduit communicating the lower end portion of said first compartment with the upper portion of said second compartment for passage of heavy liquid phase from said first compartment to said second compartment, an outlet for light fluid phase from the upper end portion of said first compartment, an outlet for heavy liquid phase from the lower end portion of said second compartment, and means for introduction of fluids into said apparatus.

2. The apparatus of claim 1 wherein the walls of said partition are double walls and these double walls are flat plates.

3. The apparatus of claim 2 wherein the space intermediate the walls of said double walled partition is filled with a heat insulating material.

4. The apparatus of claim 1 wherein the walls of said partition are double walls and comprise a pair of concentrically spaced tubes, one of said compartments being within the inner tube of said pair of tubes and the other being an annulus intermediate the outer tube of said pair of tubes and the walls of said vessel.

5. In the apparatus of claim 4 wherein the space between the concentrically spaced tubes is filled with heat insulating material.

6. A vapor-liquid contacting apparatus comprising a vessel having its axial dimension disposed double walled vertically, a vertically disposed partition in said vessel dividing same into first and second compartments extending substantially throughout the vertical dimension of said vessel, the walls of said double walled partition being spaced from one another, vapor-liquid contacting means disposed operatively in each of said compartments, a first conduit communicating the normally vapor containing space of the upper portion of said second compartment with the lower portion of said first compartment for passage of vapor from said second compartment to said first compartment, a second conduit communicating the normally liquid containing space of the lower end portion of said first compartment with the upper end portion of said second compartment, a pump in said second conduit, an outlet for vapor from the normally vapor containing space of the upper end portion of said first compartment, an outlet for liquid from the normally liquid containing space of the lower end portion of said second compartment and a third conduit communicating with one of said first and second compartments for introduction of fluid to be contacted.

7. The vapor-liquid contacting apparatus of claim 6 wherein the walls of said partition are flat plates.

8. The vapor-liquid contacting apparatus of claim 6 wherein the walls of said partition comprise a pair of concentrically spaced tubes, one of said compartments being within the inner tube of said pair of tubes and the other being an annulus intermediate the outer tube of said pair of tubes and the walls of said vessel.

9. In the apparatus of claim 6 wherein said third conduit for inlet of fluid communicates with the upper portion of said first compartment, and a conduit for admission of vapor to be contacted communicating with the lower portion of said second compartment.

10. In the apparatus of claim 6 wherein said third conduit for inlet of fluid communicates with the upper portion of said first compartment, means for supplying heat to the normally liquid containing space of the lower portion of said second compartment and a fourth conduit for inlet of fluid to the lower portion of said second compartment.

11. A vapor-liquid contacting apparatus comprising a vessel having its axial dimension disposed vertically, a pair of vertically disposed partitions in said vessel dividing same into first, second and third compartments extending substantially throughout the vertical dimension of said vessel, vapor-liquid contacting means disposed operatively in each of said compartments, a first conduit communicating the normally vapor containing space of the upper portion of said third compartment with the lower portion of said second compartment for passage of vapor from said third compartment to said second compartment, a second conduit communicating the normally vapor containing space of the upper portion of said second compartment with the lower portion of said first compartment for passage of vapors from said second compartment to said first compartment, a third conduit communicating the normally liquid containing space of the lower portion of said second compartment with the upper end portion of said third compartment, a pump in said third conduit for transfer of liquid from said second to said third compartments, a fourth conduit communicating the normally liquid containing space of the lower portion of said first compartment with the upper end portion of said second compartment, a pump in said fourth conduit for transfer of liquid from said first to said second compartments, separate outlets for vapor from the upper portion of said first compartment and for outlet of liquid from the lower portion of said third compartment, a conduit for inlet of liquid to the upper portion of said first compartment, and an inlet for fluid to one of said second and third compartments.

12. The apparatus of claim 11 wherein each of said vertically disposed partitions in a double walled plane partition, the walls of each partition being spaced from one another so as to provide a space therebetween.

13. In the apparatus of claim 12 wherein said space intermediate the walls of each double walled plane partition is filled with a heat insulating material.

14. The apparatus of claim 11 wherein each of said vertically disposed partitions is a double walled tubular partition, the walls of each partition being spaced from one another so as to provide a space therebetween.

15. In the apparatus of claim 14 wherein said space intermediate the walls of each double walled tubular partition is filled with a heat insulating material.

References Cited in the file of this patent

UNITED STATES PATENTS

| | | |
|---|---|---|
| 798,964 | Hodges et al. | Sept. 5, 1905 |
| 948,376 | Lillie | Feb. 8, 1910 |
| 972,880 | Lillie | Oct. 18, 1910 |
| 2,009,347 | Sheldon | July 23, 1935 |
| 2,137,735 | von der Emde | Nov. 22, 1938 |
| 2,159,303 | Waterman et al. | May 23, 1939 |
| 2,228,128 | Schmalenbach | Jan. 7, 1941 |
| 2,240,752 | Bogart et al. | May 6, 1941 |
| 2,398,068 | Worthen et al. | Apr. 9, 1946 |
| 2,398,836 | Lea | Apr. 23, 1946 |
| 2,456,398 | Gerhold | Dec. 14, 1948 |

FOREIGN PATENTS

| | | |
|---|---|---|
| 970,110 | France | June 7, 1950 |